(12) United States Patent
Tovar Depablos

(10) Patent No.: US 7,290,607 B2
(45) Date of Patent: Nov. 6, 2007

(54) DEVICE FOR THE SEPARATION OF THE GAS PHASE FROM A MIXTURE OF FLUID/GAS FOR USE IN HYDROCARBONS PRODUCING AND INJECTION WELLS

(75) Inventor: Juan Jose Tovar Depablos, Katy, TX (US)

(73) Assignee: Innovative Engineering Systems Ltd., Scotland (GB)

(*) Notice: Subject to any disclaimer, the term of this patent is extended or adjusted under 35 U.S.C. 154(b) by 283 days.

(21) Appl. No.: 11/097,243

(22) Filed: Apr. 4, 2005

(65) Prior Publication Data

US 2005/0217489 A1 Oct. 6, 2005

(30) Foreign Application Priority Data

Apr. 2, 2004 (IT) .................. BO2004A000187

(51) Int. Cl.
E21B 43/38 (2006.01)

(52) U.S. Cl. .................. 166/265; 166/242.1; 96/208; 96/211

(58) Field of Classification Search ............ 166/105.5, 166/265, 266, 242.1; 96/195, 208, 209, 216, 96/213, 212, 210, 211, 204, 206; 95/261
See application file for complete search history.

(56) References Cited

U.S. PATENT DOCUMENTS

| 2,398,339 | A | * | 4/1946 | Watts ...................... 166/105.5 |
| 3,048,122 | A | * | 8/1962 | Hansen .................... 166/105.5 |
| 3,128,719 | A | * | 4/1964 | Jongbloed et al. ........ 166/105.5 |
| 4,481,020 | A | * | 11/1984 | Lee et al. ...................... 96/214 |
| 5,482,117 | A | * | 1/1996 | Kolpak et al. ............... 166/265 |
| 6,019,825 | A | * | 2/2000 | Greene et al. ................. 96/209 |
| 6,283,204 | B1 | * | 9/2001 | Brady et al. ............. 166/105.5 |
| 6,564,865 | B1 | * | 5/2003 | Brady et al. ............. 166/105.3 |

* cited by examiner

*Primary Examiner*—David Bagnell
*Assistant Examiner*—Daniel P Stephenson
(74) *Attorney, Agent, or Firm*—Sughrue Mion Pllc.

(57) ABSTRACT

An apparatus for separating the gaseous phase from a mixture of fluids used during the subsurface intervention in production or injection wells. The device includes a main pipe (T) provided externally with a helix (E) having a longitudinal opening (F) whose edge (B), which is downstream from the helical flow of liquid (1) and inert gas (2), has a spiral shape pointing towards the center of pipe (T).

1 Claim, 3 Drawing Sheets

DEVICE FOR THE SEPARATION OF THE GAS PHASE FROM A MIXTURE OF FLUID/GAS FOR USE IN HYDROCARBONS PRODUCING AND INJECTION WELLS

FIELD OF THE INVENTION

The present invention relates to technology for the extraction of hydrocarbons from deep wells. Specifically, it concerns an apparatus for the separation of the gaseous phase from a mixture of fluids used for subsurface intervention.

BACKGROUND OF THE INVENTION

Different kinds of technology for the separation of the gaseous phase from a mixture of fluids used for subsurface intervention are known. The mixture usually comprises a liquid phase and a gaseous phase comprising gas such as air or nitrogen. The liquid phase is necessary to activate drilling and cleaning devices used in the wells. The gaseous phase is necessary to lower the hydrostatic pressure at depth. The gaseous phase needs to be removed to improve the performance of the devices operating at depth in the wells.

Several systems are known for separating fluids having very different densities. The known systems consist mainly of a helix wrapped around a main pipe among whose coils are present on the pipe ventilation holes that allow the separation of the gas from the particles of centrifuged liquid along the helical path of the device in the wells.

SUMMARY OF THE INVENTION

An object of the invention is to optimize the separation of the gas that needs to be returned to the surface.

The invention provides an apparatus for separating the gaseous phase from a mixture of fluids used during subsurface intervention in production or injection wells, comprising a main pipe (T) provided externally with a helix (E), wherein said pipe (T) has a longitudinal opening (F) whose edge (B), which is downstream from the helical flow of liquid (1) and inert gas (2), has a spiral shape pointing towards the center of said pipe (T) to improve its aspirating effect on the inert gas going upstream and its separating effect on the liquid (1) descending to the depth of the well.

Through extensive comparative tests, the apparatus of the invention has shown a significant improvement in the functional performance of operating devices, even at great depths.

BRIEF DESCRIPTION OF THE DRAWINGS

In FIGS. 1, 2, and 3, the reference numerals and letters are defined as follows:

1 indicates liquid particles having a density of, e.g., a thousand times higher than that of the gas;

2 indicates gas particles having a density of, e.g., a thousand times lower than that of the liquid;

each of I, II, III, IV, V, and VI indicates a particular section of the longitudinal opening between two successive coils of the helix;

B indicates an edge of the longitudinal opening shaped as a spiral pointing towards the center of the pipe (T);

E indicates the coils of the helix wrapped externally around the main pipe;

each of $E_1$ and $E_6$ indicates a particular coil of the helix corresponding to sections I and VI of the longitudinal opening, respectively;

F indicates the continuous longitudinal opening;

H indicates the ascending helical flow of the gas;

K indicates the descending helical flow of the mixture of liquid and inert gas;

P indicates the walls of the separation housing; and

T indicates the main pipe.

DETAILED DESCRIPTION OF THE INVENTION

Figure 1:
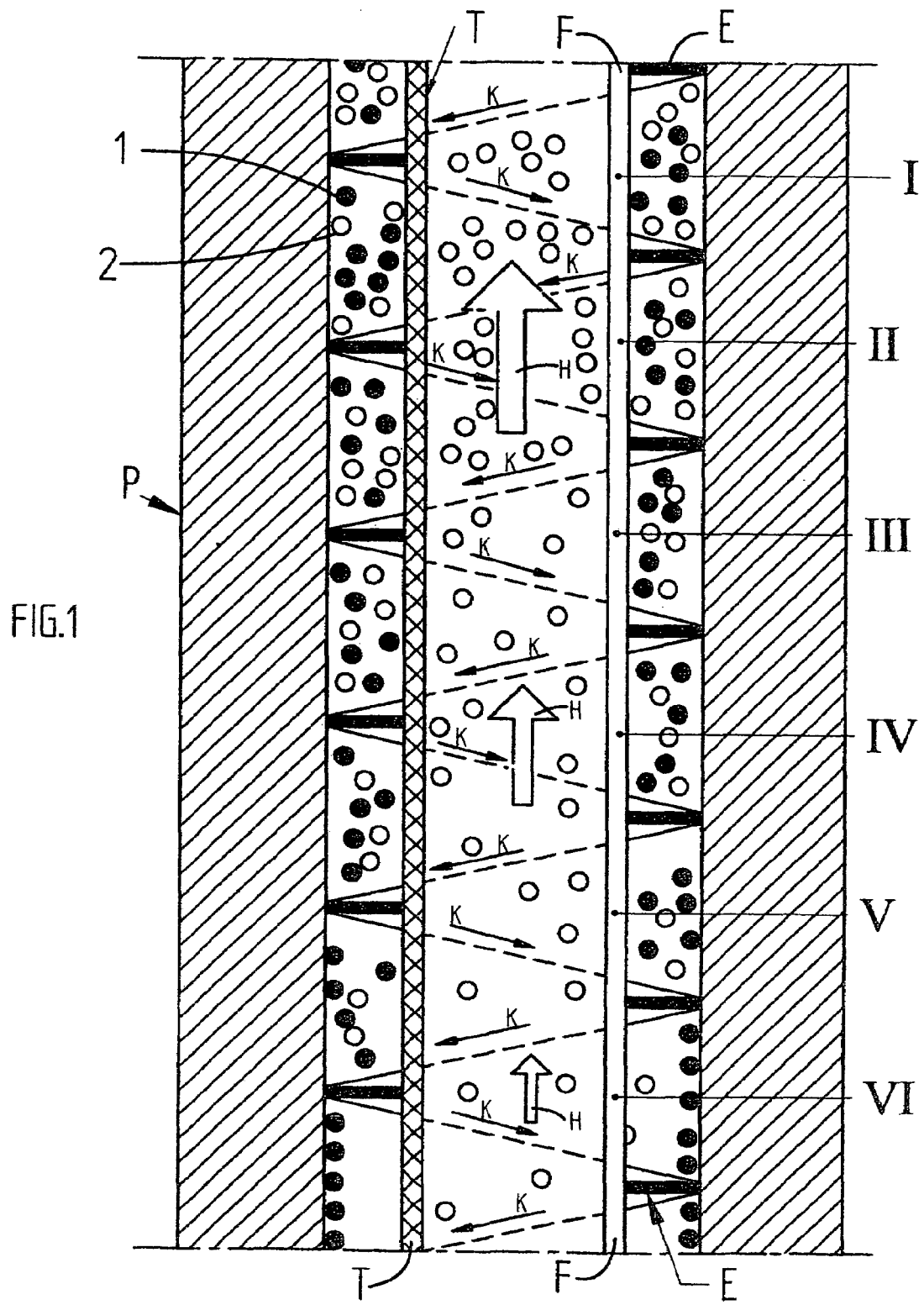
FIG. 1 represents a longitudinal section of an apparatus of the invention inserted deep into a production well.
Figure 2:
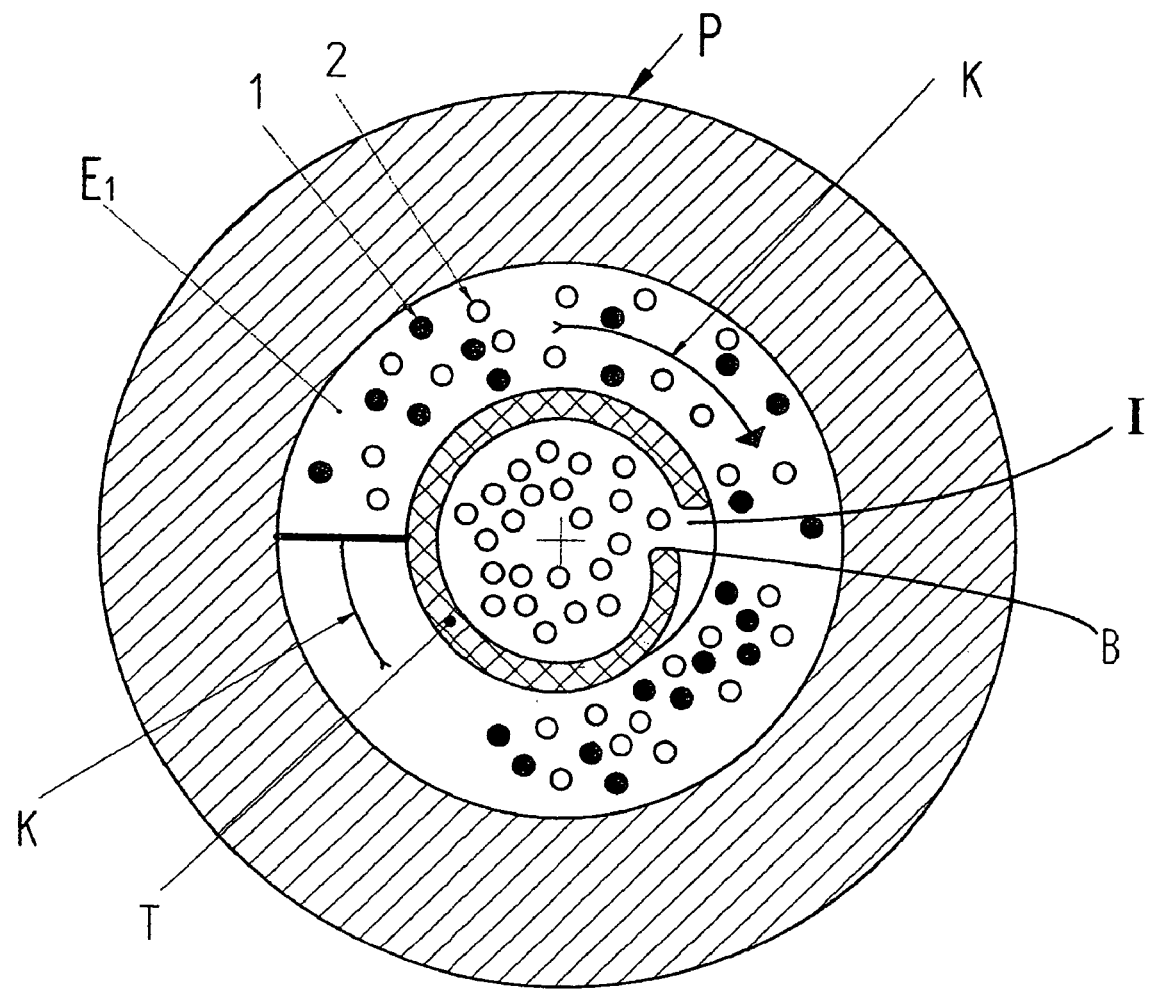
FIG. 2 represents a cross-section of an apparatus of the invention taken at section I.
Figure 3:
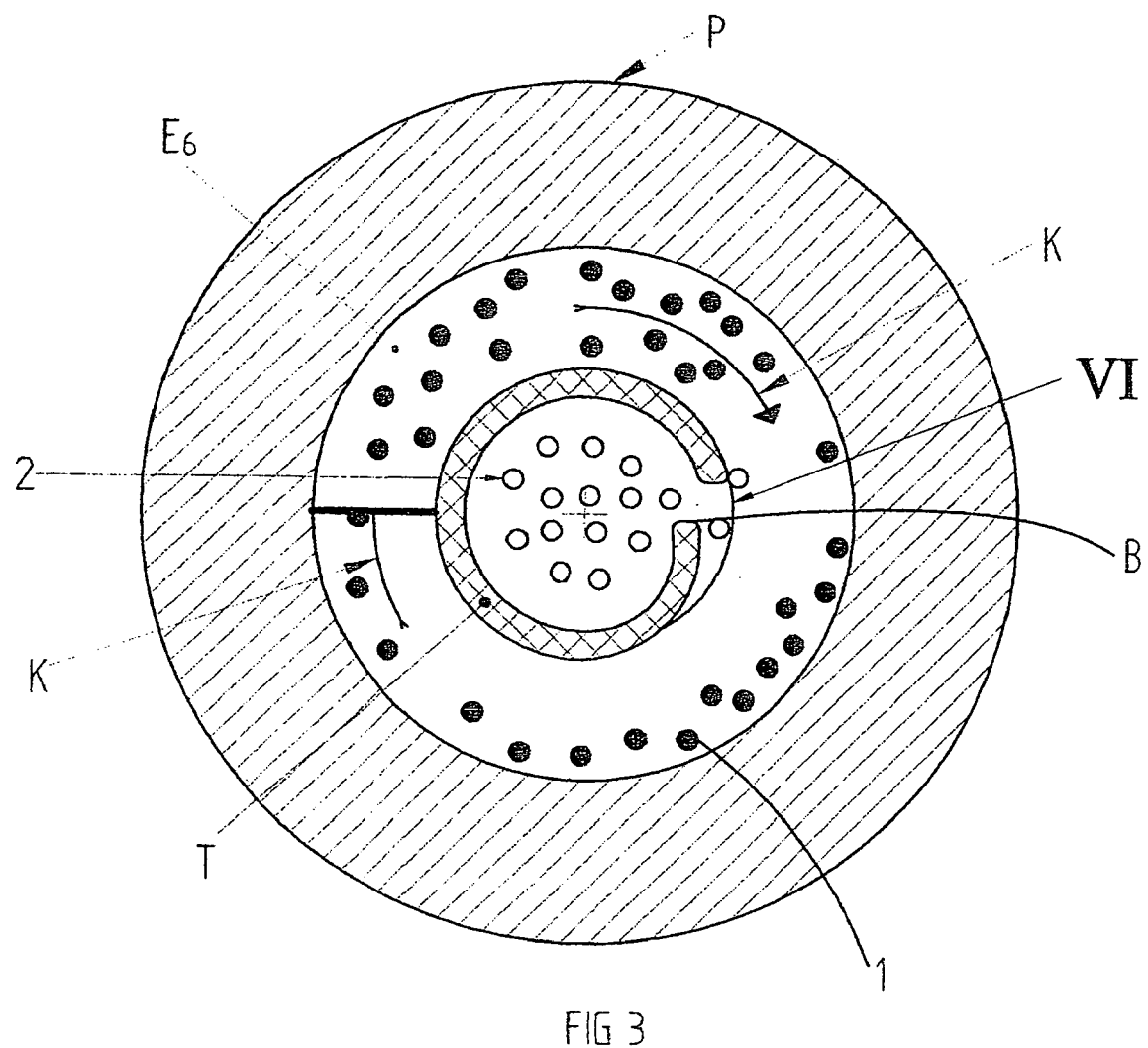
FIG. 3 represents a cross-section of an apparatus of the invention taken at section VI.

The invention is now disclosed with reference to FIGS. 1, 2, and 3 as a non-restrictive example.

FIG. 1 represents a longitudinal section of an apparatus of the invention inserted deep into a production well. The helical flow (K) of the fluid mixture (1, 2) is shown as it descends down the coils of the helix (E) as indicated by the arrows (K). Arrows (H) indicate the flow of gas particles (2) as they ascend inside the main pipe (T).

FIG. 2 represents a cross-section of the apparatus taken at a section of the apparatus comprising section (I) of the longitudinal opening (F). In coil ($E_1$) of the helix, the mixture of fluids (1, 2) is still almost fully homogenous because the separating effect of the centrifugal force caused by the angular component of the fluid velocity, marked with the arrows (K), has just begun.

FIG. 3 represents a cross-section of the apparatus taken at a section of the apparatus containing section (VI) of the longitudinal opening (F). In coil ($E_6$), liquid particles (1), which may have a density that is, for example, one thousand times heavier than the density of gas particles (2), are launched by the centrifugal forced caused by the angular velocity component of the fluid, marked with the arrows (K), towards the periphery (P) of the separation housing. Furthermore, the gas particles (2) have crossed the longitudinal opening and are conveyed upstream inside the main pipe.

FIG. 1 highlights the fact that the mixture of liquid and gas (1, 2) descending along the coils of the helix (E) becomes increasingly more concentrated with centrifuged liquid particles (1), as well as increasingly lacking in gas particles (2) that ascend upstream through the intake inside the main pipe (T). The black spheres (1), which indicate the liquid descending along the helix as pointed out by the arrows (K), are launched by the centrifugal force against the walls of the separation housing (P), while the white spheres (2), which indicate the gas phase, go through the continuous opening (F) and are pulled upstream by aspiration as pointed out by the ascending arrows (H) of FIG. 1.

With reference to FIG. 3, the edge (B) of the opening (F), which is downstream from the descending helical fluid path, is shaped as a spiral pointing towards the center of pipe (T). The aspiration effect is improved by this fact.

The clarity of FIGS. 1, 2, and 3 highlights the structural simplicity and functionality of the apparatus of the present invention. The invention, of course, allows for several variations in its practical embodiments, as far as the overall dimensions and proportions of its various components are concerned.

Upon the disclosure of its main characteristics, a person of ordinary skill in the art will be able to realize, without inventive effort, an apparatus for separating the gaseous phase from a mixture of intervention fluids at depths of producing reservoirs in extraction or injection wells, having the specific characteristics of the present invention as herein described, shown and hereinafter claimed.

An essential feature of the present invention comprises a continuous longitudinal opening (F), drawn along a pipe (T), and having its edge (B), which is downstream of the flow descending along the coils of the helix (E), have a spiral shape that points towards the center of the main pipe (T). The heuristic gradient that characterizes the inventive content of this invention is the continuity of the opening (F), which enhances the performance of the centrifugal separation of the liquid particles (1) flowing downwards away from the particles of gas (2) flowing upwards.

What is claimed is:

1. An apparatus for separating the gaseous phase from a mixture of fluids used during the subsurface intervention in production or injection wells, comprising:

a main pipe (T) including an outer wall having a longitudinally extending opening therein which extends along the length of the main pipe, said opening being defined by a first longitudinally extending edge on one side of said opening and a second longitudinally extending edge on the opposite side of the opening; and a helix extending around the exterior of the outer wall such that liquid particles and gas particles flow helically around said outer wall with said first edge being located downstream of said second edge with respect to said helical flow, wherein said first edge has a spiral shape pointing towards the center of pipe (T).

* * * * *